F. WONDRA.

FLYING MACHINE.

APPLICATION FILED SEPT. 13, 1917.

Reissued Jan. 1, 1918.

14,417.

7 SHEETS—SHEET 1.

INVENTOR

Franz Wondra

F. WONDRA.

FLYING MACHINE.

APPLICATION FILED SEPT. 13, 1917.

Reissued Jan. 1, 1918.

14,417.

7 SHEETS—SHEET 2.

INVENTOR

Franz Wondra

F. WONDRA.

FLYING MACHINE.

APPLICATION FILED SEPT. 13, 1917.

Reissued Jan. 1, 1918.

14,417.

7 SHEETS—SHEET 3.

INVENTOR

Franz Wondra

F. WONDRA.

FLYING MACHINE.

APPLICATION FILED SEPT. 13, 1917.

Reissued Jan. 1, 1918.

14,417

7 SHEETS—SHEET 4.

INVENTOR

Franz Wondra

F. WONDRA.

FLYING MACHINE.

APPLICATION FILED SEPT. 13, 1917.

Reissued Jan. 1, 1918.

14,417.

7 SHEETS—SHEET 5.

INVENTOR

Franz Wondra

F. WONDRA.
FLYING MACHINE.
APPLICATION FILED SEPT. 13, 1917.
Reissued Jan. 1, 1918.
14,417.
7 SHEETS—SHEET 6.
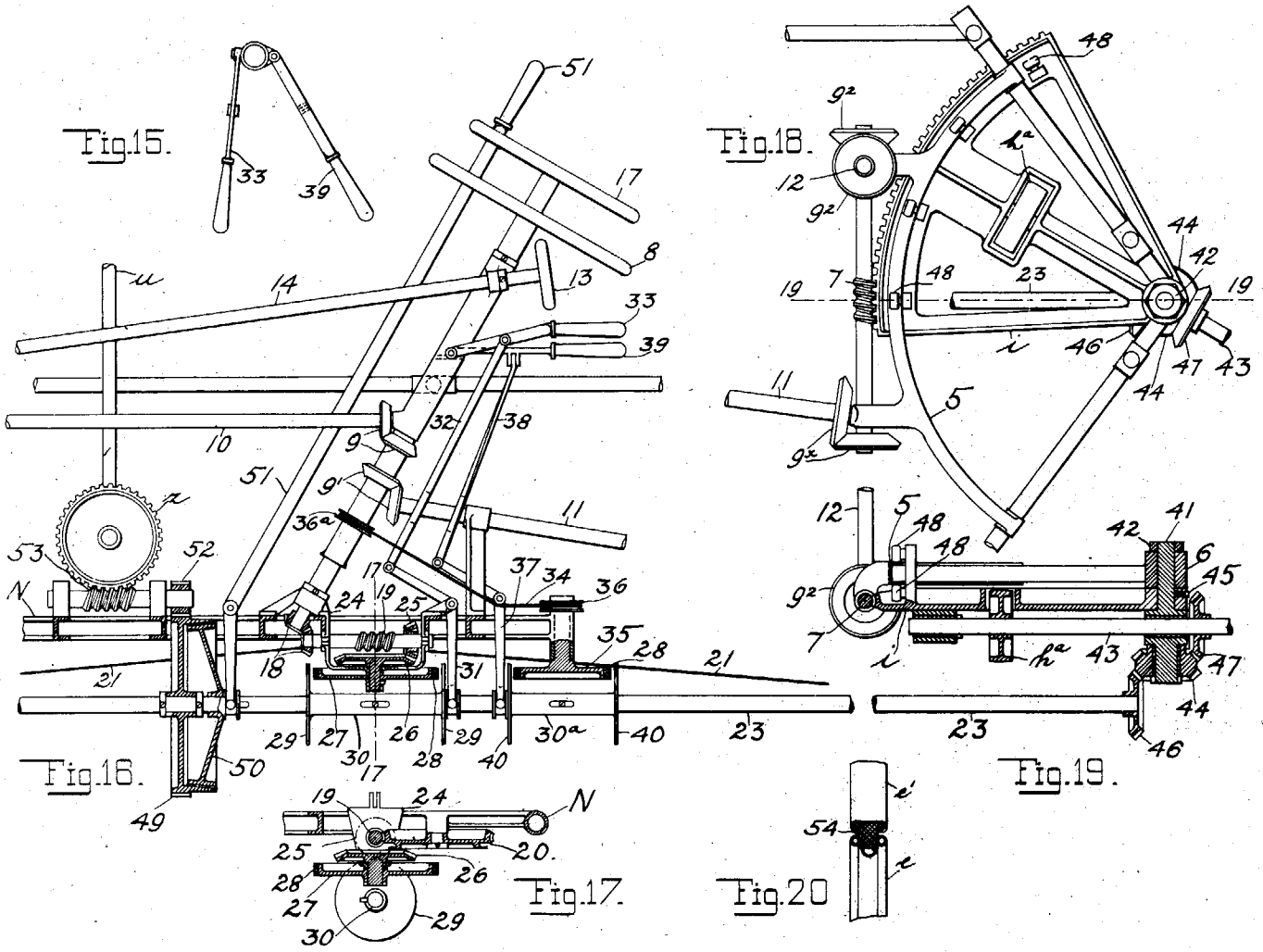
INVENTOR
Franz Wondra

F. WONDRA.

FLYING MACHINE.

APPLICATION FILED SEPT. 13, 1917.

Reissued Jan. 1, 1918.

14,417.

7 SHEETS—SHEET 7.

INVENTOR

Franz Wondra

UNITED STATES PATENT OFFICE.

FRANZ WONDRA, OF SCHENECTADY, NEW YORK.

FLYING-MACHINE.

14,417. Specification of Reissued Letters Patent. Reissued Jan. 1, 1918.

Original No. 876,125, dated January 7, 1908, Serial No. 227,979, filed October 11, 1904. Application for reissue filed September 13, 1917. Serial No. 191,323.

*To all whom it may concern:*

Be it known that I, FRANZ WONDRA, a citizen of the United States, residing in Schenectady, in the county of Schenectady and State of New York, have invented certain new and useful Improvements in Flying-Machines, of which the following is a specification.

This invention relates to flying machines with a plurality of supporting surfaces arranged one behind the other and in stepped relation, extending upward toward the rear and has for its object to obtain large lifting effect from the supporting surfaces and maintain the machine stable while in the air.

The invention consists of the arrangement of screw propellers one above the other in the rear of the flying machine, the equipment of the middle supporting surfaces for oscillatory motion, the shifting of the center of gravity of the machine.

Another object of the invention is to provide the machine with auxiliary steering mechanism driven by motor-power.

Figure 1:
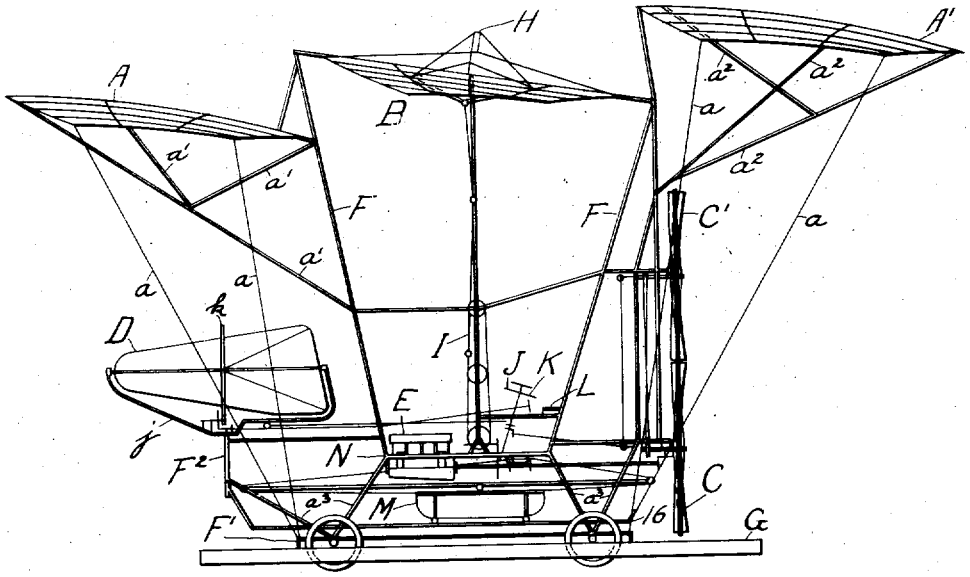
Figure 2:
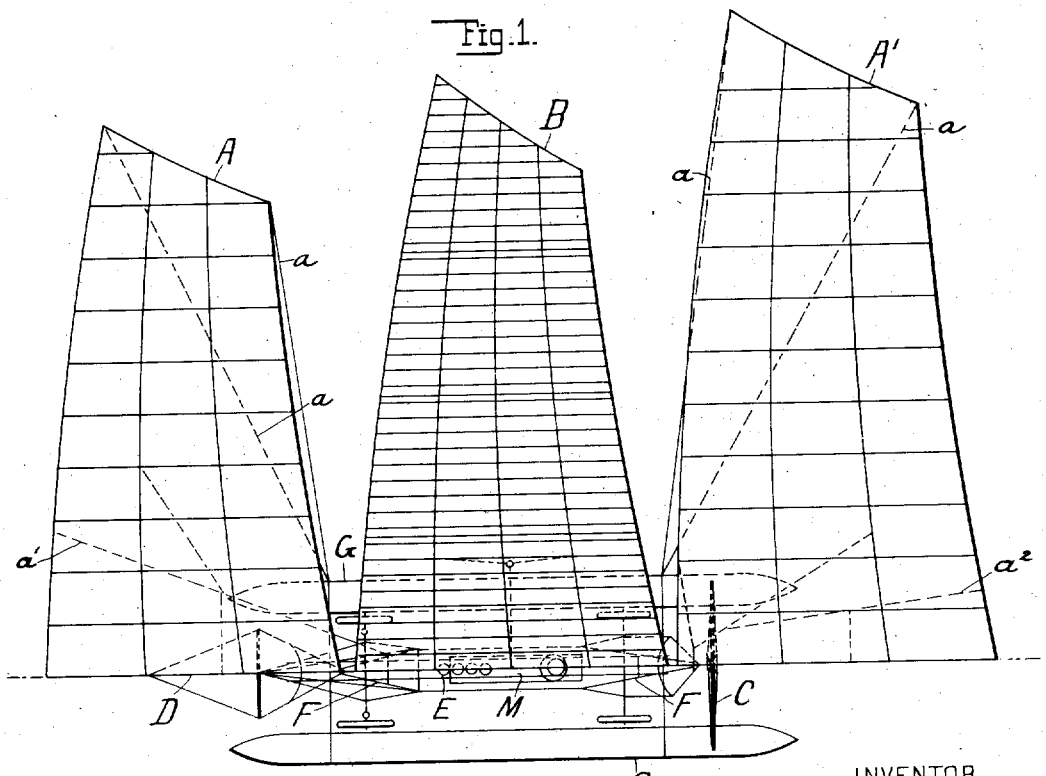
Figure 3:
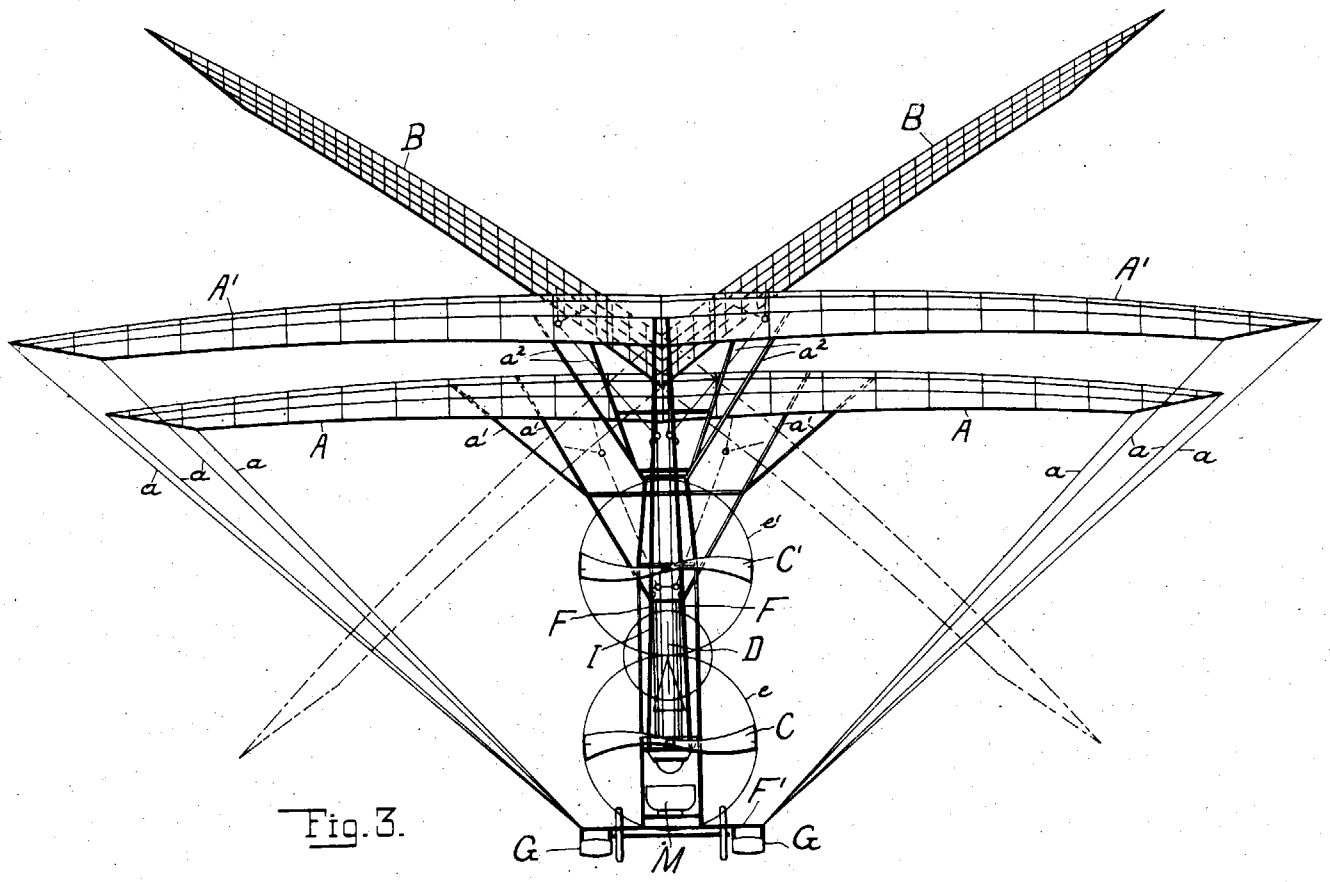
Figures 4, 5, 6:
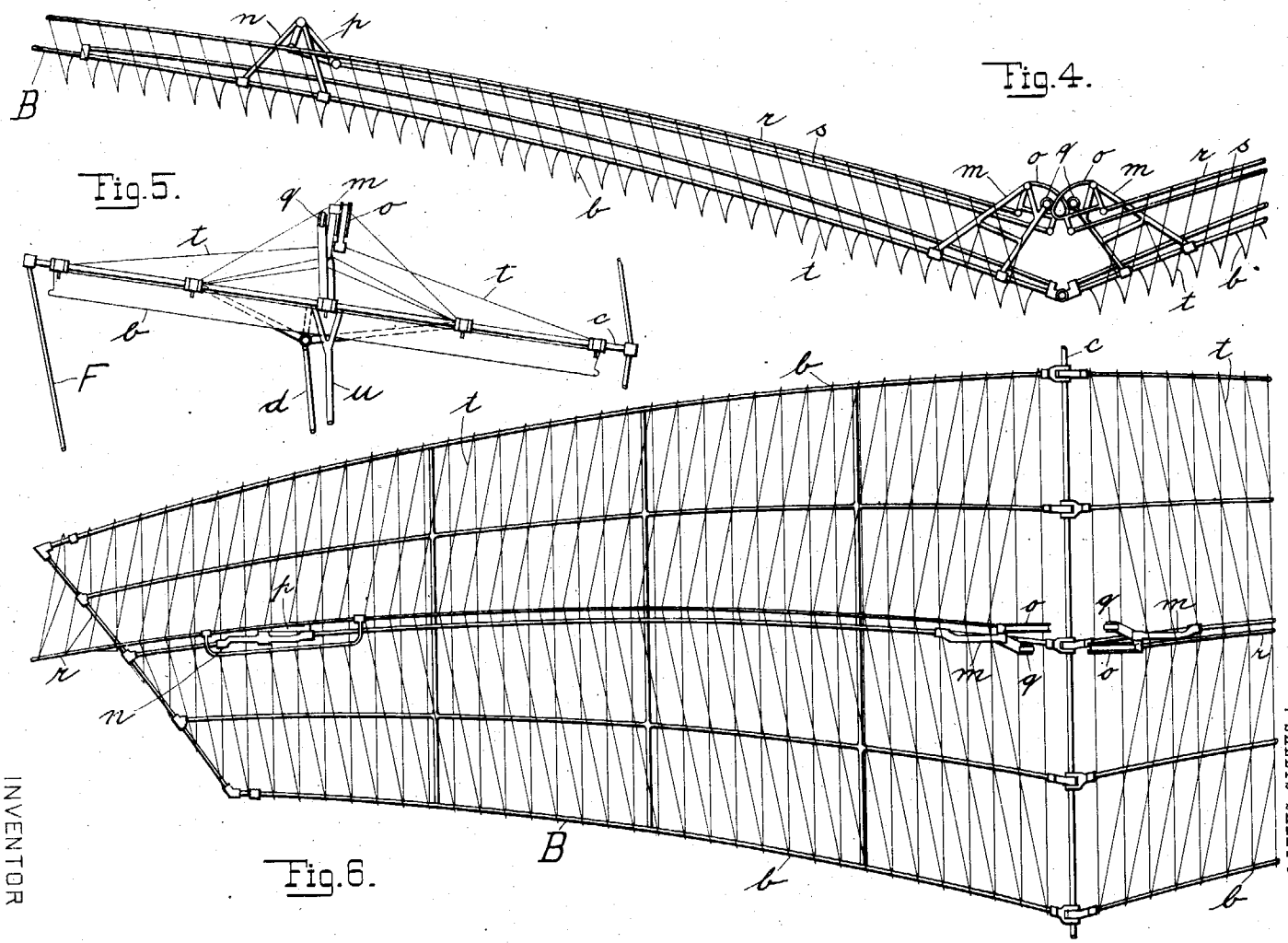
Figures 7, 8, 9, 10, 11:
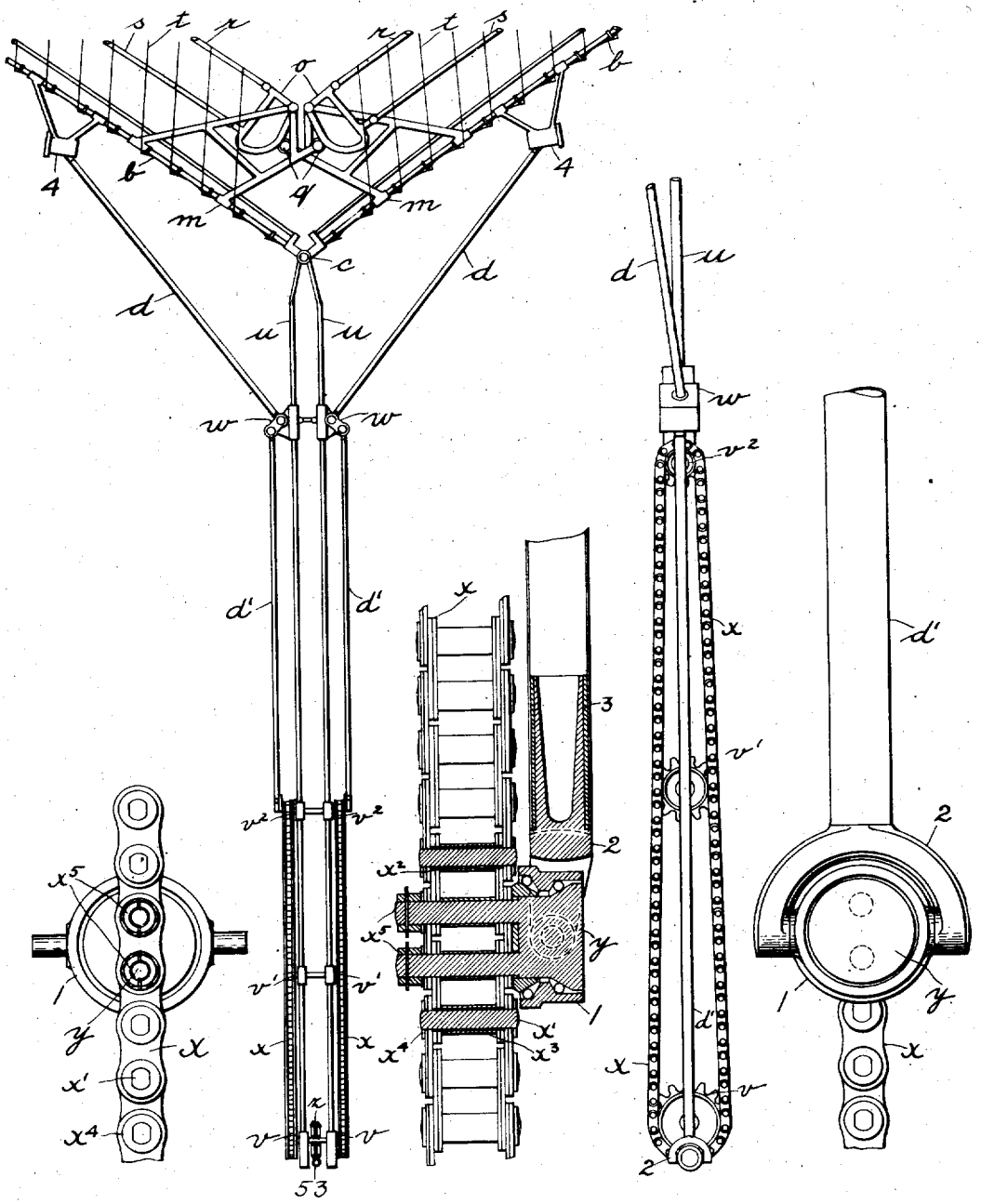
Figures 12, 13, 14:
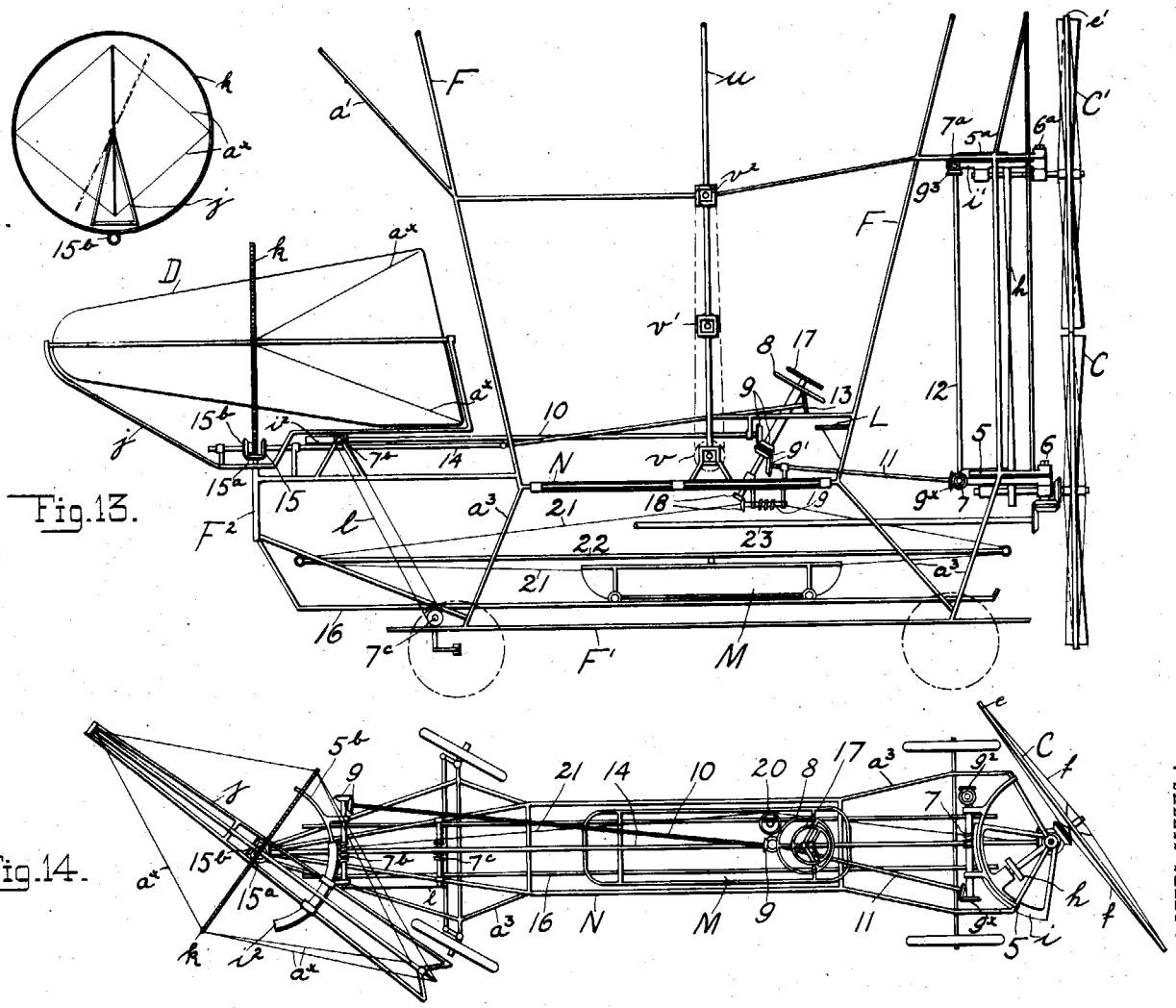
Figure 21:
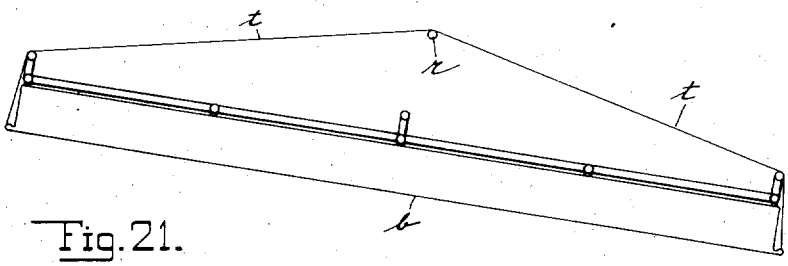
Figure 22:
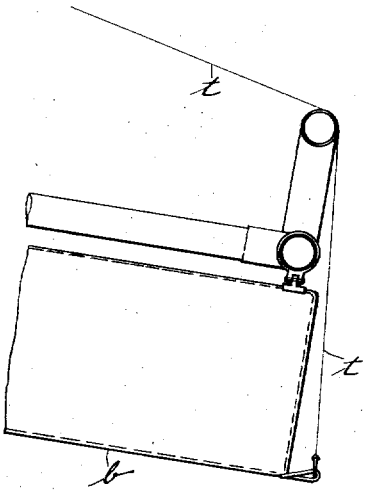
Figure 23:
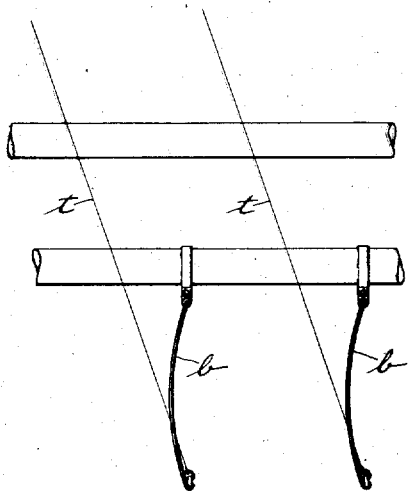

I attain these objects by the mechanism illustrated in the accompanying drawings in which Figure 1 is a side view of the flying machine showing the general arrangements of the parts of the same, Fig. 2 is a plan view of the flying machine showing only one-half of the supporting surfaces, Fig. 3 is a rear view of the flying machine showing the gradient arrangements of the supporting surfaces, the middle surfaces being shown in their highest position when oscillating and the dotted lines show the same surfaces in their lowermost oscillating position. Figs. 4, 5 and 6 are respectively a rear view, a side view and a plan view of the mechanism for closing the hinged panels of the oscillating surfaces. Fig. 7 is an enlarged detail vertical transverse section showing the mechanism for actuating the oscillating surfaces, Fig. 8 is a detail side view of the sprocket wheel and chain transmission for actuating said oscillating surfaces. Figs. 9, 10 and 11 are details of the sprocket wheel and chain transmission of the oscillating surfaces. Fig. 12 is a rear view of the steering rudder, Fig. 13 is a side view of the lower part of the flying machine drawn on a larger scale than Fig. 1, so as to illustrate the steering mechanism. Fig. 14 is a plan view of Fig. 13 showing the rudder and propellers turned sidewise for steering in horizontal plane, Fig. 15 is a detail plan view of the auxiliary steering levers, Fig. 16 is a sectional side view drawn on a larger scale, showing the motion transmitting mechanism, Fig. 17 is a vertical transverse section on line 17—17 of Fig. 16. Fig. 18 is a plan view showing the means for turning the supporting frame of the propellers for steering purposes, Fig. 19 is a vertical section on line 19—19 of Fig. 18; Fig. 20 is a detail section showing the connection between the rims of the propellers and Figs. 21, 22 and 23 are detail views of one of the panels of the oscillating surfaces.

Similar numerals refer to similar parts throughout the several views.

The flying machine is constructed in general outlines of a framework F, which is made of light steel tubing, a platform N, supported at the lower part of the framework and which carries the motor E, the operator seat L, the oscillating mechanism I, the mechanism J for steering in the horizontal plane, the mechanism K for steering in the vertical plane.

Below the platform N is the vehicle frame F′ connected by suitable upright steel tubing with the platform. Between the platform and the vehicle frame are located the horizontal guide-ways for the sliding gondola M in which some kind of ballast is carried.

At the upper front part of the framework F is located the stationary front supporting surface A and at the upper rear part of the framework is the stationary rear supporting surface A′, which is located higher above the horizontal than the surface A. The surfaces are connected to the framework F by the inclined braces $a^1$, $a^2$ and by the steel wires $a$, with the vehicle frame $F^1$.

Intermediately between the surfaces A and $A^1$ are pivotally mounted upon the framework the oscillating surfaces B, B which are located higher above the horizontal than the surface A and lower than the surface $A^1$.

At the lower front end of the framework F is arranged the rudder D, which is capable of turning around its vertical and horizontal axes.

In the rear end of the frame work F are located the screw propellers C, $C^1$ arranged vertically one above the other.

The machine is also equipped with air-tight floats G, G, which are located and supported on both sides of the lower framework and serve to support the machine on the water.

The machine is further equipped with wheels on the vehicle frame $F^1$ which support the machine while on land.

The supporting framework F is constructed of seamless steel-tubing and comprises a middle portion having inclined side and upright center tubes and inclined forwardly and backwardly extending tubes $a^2$ supported on the side-tubes. The lower horizontal vehicle-frame $F^1$ is supported below the platform N and provided with a forwardly-extending tapering frame $F^2$ in which the steering-rudder D is supported. The lower frame $F^1$ is wider at the lower part than at the upper part and provided with longitudinal guideways 16 for the shifting gondola M. The lower frame $F^1$ is stiffened by inclined tubular braces $a^3$ which are connected with the steering-rudder frame $F^2$ at the front of the machine and with the upright frame in which the shafts of the propellers C, $C^1$ are supported.

The stationary supporting surfaces A $A^1$ are widest in the middle and are tapering toward their ends. The front edge of each surface is longer than the rear edge and the transverse dimension and the area of the surface $A^1$ are greater than on the surface A. The surfaces are slightly curved both in lateral and longitudinal direction so as to be convex at their upper sides and concave at their lower sides. The surfaces have a suitable angle of incidence which is gradually decreasing toward the tips of the surfaces as clearly shown in Fig. 1. The surfaces are made of frames of steel-tubing or other suitable material and are covered with silk, linen or other material suitable for covering.

The oscillating surfaces or wings B, B which are similar in shape and angle of incidence to the surfaces A, $A^1$, are formed of steel-tubing frames and are hinged together upon a transverse pivot-rod *c* which is supported by the upper frame-work F. On the lower side of the frames are hinged slats or panels *b*, while on the upper side is arranged the mechanism H for closing the panels *b*. During the upward oscillation the air pressure above the surfaces is larger than the air pressure below the surfaces, the panels *b* open so as to permit the air to pass freely through and before the uppermost position is reached the mechanism H draws the panels against the frames, so that the downward stroke is carried out with full surfaces. The oscillating motion of the surfaces can be interrupted at any moment during the downward stroke by disconnecting the actuating mechanism I, from the power-shaft 23. Then the surfaces remain in outspread position as shown in Fig. 1 and are equal in their supporting capacity to the surfaces A or $A^1$. The oscillating surfaces are connected by links *d*, and connecting rods $d^1$ to the oscillating mechanism I. The front edges of the oscillating surfaces are longer than the front edges of the surface A.

The propellers C, $C^1$ are provided with two curved blades, as shown clearly in Figs. 3 and 13, said blades being supported at their inner-ends on the driving-shafts of the propellers and at their outer ends by circular steel-rims *e*, $e^1$ and steel-springs *f*. The blades are spoon-shaped, being widest at their outer ends and tapering toward their inner ends. The propeller-shafts are supported in journal-bearings of segments *i*, $i^1$, of the horizontal steering mechanism. Rotary motion is imparted from the motor to the shaft of the lower propeller and transmitted from the same to the shaft of the upper propeller. The lower propeller is provided with a circumferentially-grooved circular steel-rim or frame *e*, which engages a tapering rubber-tire 54 applied to the circumference of the steel-rim $e^1$ of the upper propeller $C^1$ as shown in Fig. 20. The connection between the grooved circumference of the steel-ring *e* of the lower propeller C and the tapering rubber-ring 54 on the upper propeller secures the steady rotation of both propellers in whatever position they are placed. The propellers are located at the rear end of the frame-work F and serve the twofold purpose of driving the supporting surfaces against the air and for steering in the horizontal plane in connection with the rudder D.

The rudder D is made of a tapering frame of steel tubing covered with waterproof linen, silk or other material and supported at its front and rear-ends in a supporting-frame *j*. The frame *j* is connected with the horizontal steering mechanism, which will be described hereinafter. A ring-shaped gear-wheel *k* is connected with the frame of the rudder and permits it to be moved to any suitable angle of inclination to the horizontal plane. The rudder is located at the front of the framework F, below the front surface.

The vehicle frame $F^1$ is provided with four wheels. The front wheels are adjusted for steering and are connected by an endless chain *l*, with the horizontal steering mechanism so that the machine can be steered with the same mechanism when on land.

The oscillating mechanism is shown in detail in Figs. 7 to 11. It is supported on parallel vertical steel-tubes *u*, which are located at the center of the supporting-main-frame of the machine. Between the steel-tubes *u* are supported the short transverse shafts of sprocket-wheels *v*, $v^1$ and $v^2$, which diminish in size from the lower sprocket-wheel *v* to the upper sprocket-wheel $v^2$.

The upper parts of the vertical steel-tubes $u$ serve for guiding the sleeve-shaped cross-heads $w$. The upper ends of the steel-tubes $u$ are made converging and support at their upper ends the transverse pivot-shaft $c$ of the wings B. Motion is transmitted to the wings from the main shaft 23, driven by the motor E, by means of a gear-wheel 49, which is placed loosely on the shaft and the flanged circumference of which is placed in contact with a clutch member 50 that is shifted on the main shaft 23 by a lever 51 which is fulcrumed to the platform N, as shown in Fig. 16. The lower forked end of the lever 51 engages a grooved collar on the clutch member 50 and permits thereby the clutching of the gear-wheel 49. The gear-wheel 49 meshes with a pinion 52 that is placed on the shaft of a worm 53, said shaft turning in suitable journal-bearings on the platform N. The worm 53 meshes with a worm-gear $z$ on the shaft of the lowermost pair of sprocket-wheels $v$ and between the same, as shown in Fig. 7. The rotation of the worm-gear $z$ moves two sprocket-chains $x$, $x$, which are driven by the sprocket-wheels $v$ and guided by the sprocket-wheels $v^1$ and $v^2$. When the clutch member 50 is uncoupled from the gear-wheel 49 by the lever 51, the wings are held in the position in which they are at the moment of uncoupling, by the locking action of the worm-gear 53 on the worm-gear $z$. This locking action arrests immediately the motion of the transmitting sprocket-chains $x$, $x$, and thereby the motion of the wings. When the worm-gear $z$ is rotated by the transmitting mechanism described, the sprocket-chains $x$, $x$ are set in motion by the sprocket-wheels $v$, $v^1$, $v^2$. The sprocket-chains are constructed in such a manner that the pivots $x^1$ of the links of the chains are connected with the outer pair of links, while the tubular pivots $x^2$ on the pivots $x^1$ are connected with the inner pair of links, as shown in Fig. 9. $x^3$ is a stiffening sleeve between the inner links and $x^4$ are washers at the ends of the pivots $x^1$. Two adjacent pivots of each of the double sprocket-chains are connected by a cross-piece $y$, said pivots being attached to the chains by suitable screw-nuts $x^5$. The cross-pieces $y$ are each provided with a conical head which carries by means of two sets of antifriction-balls and suitable ball-races, a ring-shaped sleeve 1, and to these sleeves at corresponding points on the two chains are pivoted the forked lower ends 2, of two tubular connecting rods $d^1$. Each forked lower end 2 is made of two parts, the shanks of which are connected by a sleeve 3 that is inserted into the lower end of the tubular connecting-rod $d^1$ as shown in Figs. 9 and 11. The upper ends of the connecting rod $d^1$ are applied by pivot-links to the cross-heads $w$ which are guided on the upright steel-tubes $u$. The crossheads $w$ are connected by universal joints with the lower ends of the lever-rods $d$, the upper ends of which are likewise connected by ball-joints with sockets 4, said sockets being supported by suitable braces on the center-ribs of the oscillating wings B, as shown in Fig. 7.

The mechanism H for closing of the panels C is operated automatically with each oscillating motion of the wings. The closing motion of the wing panels is based on the fact that during the upward motion of the wings B, the angle between them becomes gradually smaller, so that the parts supported on the wing-frames have to "give" and assume a different position. Figs. 4, 5 and 6 show the mechanism for closing the panels $b$. On the center-ribs of the frames of wings B are supported near the transverse pivot-shaft $c$ of the same, converging supporting frames $m$, $m$, and near the outer ends of the ribs inclined triangular frames $n$, $n$. To the frames $m$ are applied movable levers $o$, and to the frames $n$ movable levers $p$ connected by connecting rods $r$, $s$, with said levers $o$. The shorter arms of the supporting frames $m$ are extended beyond the upper cross pieces of the frames and provided with rollers $q$, as shown clearly in Fig. 7, these rollers fitting into grooves on the bent sides of the levers $o$. The levers $o$ and the rollers $q$ are so arranged on the supporting frames $m$ that the lever of one wing is operated by the roller on the frame of the other wing. The levers $o$ are guided along the rollers $q$, which are grooved sufficiently for this purpose. By the upward motion of the wing, the shorter arm of the supporting frame $m$ on one wing presses on the lever $o$ of the opposite wing, so that the latter turns through a quarter of a circle. This motion is transmitted by the tubular connecting-rods $r$ and $s$ to the levers $p$ near the outer ends of the wings. The hinged panels $b$ are connected by gut-strings $t$ with the tubular connecting rods $r$, as shown clearly in Figs. 21, 22, and 23.

Before the oscillating surfaces reach their highest position, the panels $b$ are moved from the open position, shown in Fig. 4, into the closed position, shown in Fig. 7, so that the wings are ready for the downward motion with all the panels in closed position. When the wings arrive at their lowermost position and commence the next upward oscillation, the panels are placed in open or pendent position by the counter pressure of the air, so that there is little resistance by the air to the upward motion of the wings. There are however no means provided which would force the panels to open and when the machine is lifted from the ground or water entirely by the lift of its inclined surfaces, the panels remain closed also on the upward stroke.

Steering of the machine in the horizontal plane is effected by the joint action of the rudder D and propellers $C^1$ $C^1$. The rudder is moved in the direction in which the flying machine is to be steered, either to the right or left, and simultaneously therewith the propellers are shifted in opposite direction into such a position that their shafts form an angle with the longitudinal axis of the machine, corresponding to that of the rudder with said axis. The steering-mechanism is shown in Figs. 13, 14, 15, 17, 18 and 19. The frame *j* of the steering rudder D turns on a vertical pivot at the lower forwardly-extending part $F^2$ of the main-frame. To the bottom of the rudder-frame *j* is attached a worm-segment $i^2$ which meshes with a worm $7^b$, the shaft of which is supported on the main-frame. Motion is transmitted to the worm $7^b$ from a hand steering-wheel 8, which is attached to an inclined tubular rod, as shown clearly in Fig. 16, and which transmits motion by bevel-gears 9, 9, to a tubular rod 10 and by the same and bevel-gears 9, 9, to the shaft of the worm $7^b$, as shown in Fig. 14. At the same time the motion of the steering-wheel 8 is transmitted by a second set of bevel-gears $9^1$, $9^1$ adjacent to and below the first set 9, 9, to a tubular rod 11, which turns in suitable bearings supported on the rear-frame of the machine, and by the rod 11 and a bevel-gear transmission $9^x$ $9^x$ to the shaft of the worm 7 and from said shaft by bevel-wheels $9^2$, $9^2$ at the opposite end, to an upright tubular rod 12, and bevel gears $9^3$ $9^3$ to the shaft of the worm $7^a$. On the rear-part of the supporting main-frame are located horizontal carrier segments 5 and $5^a$ for the shafts of the propellers. These carrier-segments 5, $5^a$ are rigidly attached to the rear-frame and support at their centers the upright bearings 6 and $6^a$.

On the circumference of the carrier-segments 5 and $5^a$ are located the journal-bearings for the shafts of the worms 7 and $7^a$. On the stationary carrier- segment 5 is supported the worm-segment *i* guided thereon by means of rollers 48. The hub of the worm-segment *i* is made fast to the hanger-shaft 41 by a clamping-screw 45. The worm-segment *i* turns with the upright shaft, 41, which is supported in the hanger-bearing 6 by means of screw-nut 42. Antifriction roller-bearings are arranged between the hanger-bearing 6, the screw-nut 42 and the hub of the worm-segment *i*. The hanger-shaft 41 supports, in a recess, the shaft 43 for the lower propeller. On a collar on the lower end of the shaft 41 is supported by means of anti-friction-bearings, a double bevel-gear wheel 44. Motion is transmitted from the main-shaft 23 by a bevel-gear 46 to the lower gear of the double-bevel gear 44, while the upper gear of the same transmits motion to a bevel gear 47 keyed to the shaft 43 of the lower propeller. By this transmission, rotary motion is imparted to the lower propeller in whatever position the same is placed for steering. From the lower propeller shaft 43 rotary motion is transmitted to the upper propeller $C^1$ by a pulley $h^a$ and belt *h* to a pulley on the shaft of the upper propeller. The main-shaft 23 receives rotary motion from the crank-shaft of the motor, which is supported on the platform N, by means of gear-wheels, pulleys and belt, or other transmission.

Fig. 12 shows a rear-elevation of the rudder and its frame. The dotted lines show the rudder placed in inclined position to a vertical plane passing through the longitudinal axis of the rudder-frame. The gear-wheel *k* is connected by steel-cables $a^x$ with the front and rear-ends of the longitudinal rudder-frame. The turning of the rudder into laterally-inclined position is accomplished by a hand-wheel 13 located below the steering-wheel 8, jointed connecting-rods 14 and gears 15, $15^a$ and $15^b$, gear $15^b$ being in mesh with the gear-wheel *k* as shown in Figs. 12 and 13. The gear-wheel 15 is located at the end of the lower connecting-rod 14 and supported at the front-end of the main-frame, the gear-wheel $15^a$ on the rudder-supporting frame *j* and gear-wheel $15^b$ also loosely on the supporting-frame *j*. By this gear-wheel transmission the rudder can be turned sidewise in whatever steering position the same has to be placed. The worm $7^b$ by which the rudder is moved horizontally in either direction is connected by the chain and sprocket-wheel transmission *l* with the shaft of a worm $7^c$, which is located near the front-axle of the vehicle, so that the steering-wheel 8 can also transmit horizontal steering motion to the vehicle when the machine is moved over firm ground.

The steering of the machine in the vertical plane is accomplished by shifting the gondola M in forward or backward direction on its tubular guide-rails 16. The motion of the gondola is controlled by a hand-wheel 17, which is located adjacent to and above the steering-wheel 8 and the steering-pillar in which said rods are supported. The tubular rod to which the hand-wheel 17 is applied passes through the tubular rod of the hand-wheel 8 and carries at its lower end a bevel-wheel 18, which meshes with a similar bevel-wheel 18 on the horizontal shaft of a worm 19, as shown in Figs. 13 and 16. The worm 19 meshes with a worm-gear 20, which is located sidewise of the same, but in the same plane with the worm 19, as shown in Fig. 17. The gear-wheel 20 is provided with a grooved circumference, around which the steel-rope 21 is passed. The steel-rope 21 passes over suitable guide-pulleys at the front and rear-ends of the lower main-frame and is attached to the ends of the gondola M, as shown in Fig. 13, so that the same can be moved in one or the opposite direction on its ways 16, according to the direction imparted to it by the steel-rope 21. The gondola M is held in position on the ways by a horizontal steel-tube 22, having a suitable guide-roller for the gondola and guide-pulleys at its ends for the shifting steel-rope 21. By the shifting of the gondola, together with the weight of the ballast for the occupant of the same, the center of gravity of the flying machine is moved either in forward or backward direction, according to the direction imparted to the gondola. By the forward or backward motion, the angle of inclination of the aeroplanes and the wings toward the horizontal plane is changed, so that the machine can be moved in upward or downward direction.

If the machine flies against the wind, the force of the wind can be utilized for sustentation of the machine by shifting the center of gravity of the machine forward of the center of pressure of the supporting area.

For the purpose of effecting the steering operation quickly and effectively, both steering-mechanisms are provided with auxiliary steering-devices, which are actuated from the main-shaft 23. For this purpose the platform N is provided with a U-shaped hanger-frame 24, in which the shaft of the worm 19 is supported. To the shaft of the worm 19 is keyed a bevel-gear 25, which meshes with a bevel-gear 26, the upright shaft of which is journaled in the lower part of the U-shaped hanger-frame 24. At the underside of the hanger-frame, but keyed to the shaft of the bevel-gear 26, is arranged a friction-disk 27, which is provided with a circumferential rubber-rim 28. Below the friction-disk 27 is arranged on the main-shaft 23 a longitudinal sliding-sleeve 30, which is guided by slots on diametrically-opposite pins and provided at opposite ends with friction-disks 29. Either one of the friction-disks can be placed in contact with the circumference of the friction-disk 27 by means of a lever 33, which is located on the steering-pillar in which the tubular rods of the hand-wheels 8 and 17 are supported, said lever being pivoted to said pillar below the steering-wheel 8 and connected by a pivot-rod 32 and elbow-lever 31 with a grooved collar adjacent to the rear friction-disk 29. The elbow-lever is fulcrumed to a suitable support on the main-frame and made forkshaped at its lower end, so as to engage said collar. The auxiliary steering-lever 33 permits the shifting of the sleeve 30 and its friction-disks in either direction, so that one friction-disk 29 or the other is placed in contact with the main transmitting-disk 27. The rotary motion imparted to the friction-disk 27 imparts, by means of the bevel-gears 26, 25, worm 19 and worm-gear 20, a quick motion to the steel-rope 21, so that the gondola M is moved in forward direction on its guide-ways by the downward motion of the lever 33, whereby the center of gravity is moved in forward direction, and a greater load is placed on the front aeroplane A, and the flying machine is moved in downward direction, or it is moved in backward direction by the upward motion of the lever 33 moving the sleeve 30 to the rear end of its guide-ways, whereby the center of gravity of the machine is moved in backward direction; so that a greater load is placed on the rear aeroplane, whereby the load on the front aeroplane is diminished and thereby the machine placed in a position for ascending motion.

The second auxiliary steering-device is operated by the lever 39 and connected with a horizontal steering mechanism. In the platform N is supported a friction-disk 35, which is provided at its circumference with a rubber-rim 28. This friction-disk is placed in contact with one of the friction-disks 40 at the ends of a second sleeve 30ᵃ that is guided on the main-shaft 23 by pins in the same manner as the sleeve 30. On the upper end of the shaft of the friction-disk 35 is mounted a driver-pulley 36, around which and a pulley 36ᵃ on the tubular shaft of the steering-wheel 8 is passed a steel-rope or belt. By the auxiliary lever 39, connecting-rod 38 and elbow-lever 37, which latter engages by its forked lower end a grooved collar on the end of the sleeve 30ᵃ, either one of the friction-disks 40 on said sleeve is placed in contact with the circumference of the friction-disk 35, so that by the movement of the lever 39 toward the right or left, the horizontal steering mechanism is moved toward the right or left, as desired.

The flying machine starts from the ground or preferably from water by starting the motor E, whereby the propellers are set in rotation and drive the machine forward. Each of the supporting surfaces moves against a layer of air which inertia has not been disturbed by any preceding surface. When the machine acquires certain speed, then the oscillating wings are set to oscillate and being mounted at an angle to the horizontal and having the combined rear edges longer than the front edges and because the oscillation takes place while the machine is driven forward, displace the air toward the rear and thereby each oscillation drives the machine forward and the air rearward toward the propellers. The propellers rotate now in increased air pressure and drive the machine forward at accelerated speed. By continued oscillation of the wings the machine is driven against the air faster and faster until the supporting surfaces have acquired sufficient lift to support the machine in the air entirely.

The oscillation of the wings decreases the starting distance necessary for the machine to take the air.

The machine once in flight, the oscillation of the wings can be stopped and the wings used as fixed supporting surfaces as shown in Fig. 1.

The gradient position of the supporting surfaces, extending upward toward the rear makes it possible that each surface is driven against an undisturbed layer of air.

To maintain and restore the gradient position of the supporting surfaces while in flight, the center of gravity of the machine is shifted by shifting the ballast-carrying gondola forward or backward as required to correspond with the speed of the machine.

Also the arrangement of the propellers in the rear of the machine and one above the other serves greatly to preserve the gradiently ascending position of the supporting surfaces which is essential to bring tandem surfaces to equal lifting capacity.

The rearwardly located surfaces having gradually increasing front edges, utilize the turbulent air escaping over the tips of the forward surfaces.

Having thus described my invention, I claim as new and desire to secure by Letters Patent:

1. In a flying machine a supporting frame structure, stationary supporting surfaces carried by said frame structure at the front and rear, the rear stationary surface being located higher above the horizontal than the front stationary surface, vertically oscillating surfaces pivoted to said frame structure between said stationary surfaces, means for imparting oscillatory motion to said oscillating surfaces and means for interrupting said oscillatory motion, in combination with means for propelling the surfaces against the air.

2. In a flying machine a supporting frame structure a gradient series of supporting surfaces extending upward toward the rear, attached to said frame structure, a rudder mounted at the front of said frame structure, means for moving said rudder about its vertical axis, means for moving said rudder about its longitudinal axis, and means for propelling said surfaces against the air.

3. A flying machine comprising a supporting frame structure, a gradient series of supporting surfaces extending upward toward the rear attached to said frame structure, a rudder mounted at the front of said frame structure, screw-propellers mounted one above the other at the rear of said frame structure, means for simultaneously shifting said propellers and rudder angularly to the longitudinal axis of the flying machine and means for driving said screw propellers.

4. In a flying machine a supporting frame structure, a pair of vertically oscillating surfaces pivoted to said frame structure and each comprising a plurality of swinging panels, means for oscillating said surfaces and means operated by each of said surfaces for operating the panels of the other surface automatically when reaching a predetermined angle.

5. In a flying machine the combination with a supporting frame structure, of oscillating surfaces pivoted thereto, parallel upright guide rods carried by said frame below said surfaces, stud shafts connecting said guide rods, sprockets mounted on said stud shafts, chains movable over said sprockets, crossheads movable on said uprights, rods connecting said chains and said crossheads, and means for connecting the latter with the oscillating surfaces.

6. In a flying machine a supporting frame structure, a plurality of supporting surfaces attached to said frame structure, a power driven operating shaft, means operated manually for steering the machine in the horizontal plane, an auxiliary power driven mechanism for steering the machine in the horizontal plane and a device for coupling said operating shaft with said auxiliary mechanism in combination with means for driving the machine against the air.

7. In a flying machine a supporting frame structure, a ballast-carrying gondola guided therein, manually operated means for shifting said gondola, a power driven operating shaft, auxiliary mechanism for shifting said gondola and a device for coupling said operating shaft with said auxiliary mechanism.

8. In a flying machine, a supporting frame, a ballast-carrying gondola guided therein, a power driven operating shaft, means for shifting said gondola, and means for coupling said shifting means with said operating shaft.

9. In a flying machine a supporting frame, a ballast-carrying gondola guided therein, means for manually shifting said gondola, a friction wheel in operative connection with said shifting means, a power driven operating shaft, a friction sleeve on said shaft having terminal disks disposed at either side of said friction wheel and movable into contact therewith, and means for shifting said sleeve in either direction.

10. In a flying machine, in combination, with a supporting-frame, aeroplanes carried by said frame at the front and rear and extending to either side thereof, the rear aeroplane being higher than the front aeroplane, vertically oscillating wings pivoted to said frame between said aeroplanes and forming when outspread a third aeroplane similar to the others, and wing-operating mechanism.

11. In a flying machine, the combination, with a supporting frame, of laterally and longitudinally curved aeroplanes mounted thereon and extending transversely thereof to either side of the same at the front and rear of the machine, said aeroplanes being inclined downwardly toward the rear of the machine and the rear aeroplane being higher than the front aeroplane, wings mounted on said frame between said aeroplanes, and means for oscillating said wings.

12. In a flying machine, the combination, with a supporting frame, of a shaft extending longitudinally thereto and supported thereby, wings pivoted to said shaft and extending to either side of the machine, upright guiderods below said wings, crossheads guided vertically on said guide-rods, a connecting-rod connecting each crosshead with its corresponding wing, and means for reciprocating said crossheads.

13. In a flying machine, the combination, with a supporting frame, of wings pivoted thereto, parallel upright guide-rods carried by said frame below said wings, stud-shafts connecting said guide-rods, sprockets mounted on said stud-shafts, chains movable over said sprockets, crossheads movable on said uprights, rods connecting said chains and said crossheads, and means for connecting the latter with the wings.

14. A flying machine comprising a supporting frame, a pair of wings pivoted thereto and each comprising a plurality of swinging panels, means for oscillating said wings, and means operated by each of said wings in its oscillatory movement for operating the panels of the other wing and thereby feathering said wing.

15. In a flying machine, the combination, with wings pivoted to a common shaft, of swinging panels carried by each wing, and means mounted on each wing for operating the panels of the other wing, said means being operated automatically when said wings assume a predetermined angle.

16. A flying machine comprising a supporting frame, means for propelling the same through the air, a rudder at the front of said frame, means for angularly moving said rudder about a vertical axis, and means for angularly moving the same about an axis disposed longitudinally of the machine.

17. A flying machine including in its construction a rudder formed of a forwardly tapering frame mounted to turn on an axis disposed longitudinally of the machine.

18. A flying machine including in its construction a rudder formed of a forwardly tapering frame mounted to turn on an axis disposed longitudinally of the machine, a gear-wheel embracing said frame, a second gear-wheel engaging the first, and means for rotating said second gear-wheel.

19. A flying machine including in its construction steering propellers mounted one above the other, means for simultaneously shifting said propellers to different angles to the vertical longitudinal plane of the machine, means for transmitting motion from one of said propellers to the other irrespective of their position, and means for driving one of said propellers while in its different positions.

20. In a flying machine, the combination, with the parallel propeller-shafts, of the propellers mounted thereon, and the circular frames or rims mounted on said propellers and traveling in frictional contact with each other.

21. In a flying machine, the combination, with the frame, of the horizontal guideways arranged longitudinally therein, the ballast-carrying gondola movable in said guideways, the steel rope-transmission for moving said gondola in either direction, and the steering-wheel for actuating said transmission.

22. In a flying machine, the combination, with a steering propeller, of manually-operable means for shifting the same, and auxiliary power-operated propeller-shifting means.

23. In a flying machine, a steering propeller, means for manually shifting the same angularly with respect to the vertical longitudinal plane of the machine, a power-driven operating shaft, and a device for coupling said operating shaft with said shifting means.

24. In a flying machine, the combination, with a steering propeller, of means to shift the same angularly with respect to the vertical longitudinal plane of the machine, a manually-operable steering pillar in operative connection with said shifting means, a power-driven operating shaft, a friction-wheel adapted to be driven thereby, and an operative connection between said friction-wheel and said steering pillar.

FRANZ WONDRA.